United States Patent
Poslinski (10) Patent No.: US 7,747,132 B2
(45) Date of Patent: Jun. 29, 2010

(54) METHOD AND SYSTEM FOR DISPLAYING MULTIPLE MEDIA CONTENT INSTANCES DURING A SINGLE VIEWING SESSION

(75) Inventor: Thomas Poslinski, Elma, NY (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1676 days.

(21) Appl. No.: 10/926,612

(22) Filed: Aug. 26, 2004

(65) Prior Publication Data

US 2006/0044951 A1    Mar. 2, 2006

(51) Int. Cl.
*H04N 9/79* (2006.01)
*H04N 5/76* (2006.01)
(52) U.S. Cl. .................................. 386/83; 386/35
(58) Field of Classification Search ............... 386/1, 386/35, 45–46, 125–126, 83
See application file for complete search history.

(56) References Cited

U.S. PATENT DOCUMENTS

| | | |
|---|---|---|
| 6,091,886 A | 7/2000 | Abecassis |
| RE37,000 E | 12/2000 | Shinyagaito et al. |
| 6,177,931 B1 | 1/2001 | Alexander et al. |
| 6,259,443 B1 | 7/2001 | Williams, Jr. |
| 6,407,779 B1 | 6/2002 | Herz |
| 6,564,005 B1 | 5/2003 | Berstis |
| 6,580,870 B1 * | 6/2003 | Kanazawa et al. ............ 386/95 |
| 6,748,596 B2 | 6/2004 | Knudson et al. |
| 7,257,308 B2 * | 8/2007 | Plourde et al. ................ 386/46 |
| 2002/0044225 A1 | 4/2002 | Rakib |
| 2002/0174430 A1 * | 11/2002 | Ellis et al. ..................... 725/46 |
| 2003/0126600 A1 * | 7/2003 | Heuvelman ................... 725/35 |

* cited by examiner

*Primary Examiner*—Thai Tran
*Assistant Examiner*—Nigar Chowdhury
(74) *Attorney, Agent, or Firm*—Steven L. Nichols (57) ABSTRACT

A method and system for displaying multiple media content instances during a single viewing session. The method includes displaying a recorded program list graphical user interface (GUI) listing a number of recorded media content instances, selecting one of the recorded media content instances to be displayed on a display device, and displaying the selected media content instance and one or more additional recorded media content instances during the single viewing session.

49 Claims, 11 Drawing Sheets

RECORDED PROGRAM LIST

| Title | Length | Date Recorded |
|---|---|---|
| Seinfeld | 30 min | 7/1/04 |
| Sportscenter | 60 min | 6/28/04 |
| The Simpsons | 30 min | 6/27/04 |
| Seinfeld | 30 min | 6/24/04 |
| Wimbledon | 120 min | 6/23/04 |
| Sienfeld | 30 min | 6/17/04 |

RECORDED EPISODE LIST

| Title | Length | Date Recorded |
|---|---|---|
| Seinfeld | 30 min | 7/1/04 |
| Seinfeld | 30 min | 6/24/04 |
| Sienfeld | 30 min | 6/17/04 |

RECORDED EPISODES IN CURRENT VIEWING SESSION

| Title | Length | Date Recorded |
|---|---|---|
| Seinfeld | 30 min | 7/1/04 |
| ✓ Seinfeld | 30 min | 6/24/04 |
| ✓ Sienfeld | 30 min | 6/17/04 |

184

CANCEL

DELETE SELECTED EPISODES

METHOD AND SYSTEM FOR DISPLAYING MULTIPLE MEDIA CONTENT INSTANCES DURING A SINGLE VIEWING SESSION

BACKGROUND

The advent of computers, interactive electronic communication, the Internet, and other advances in the digital realm of consumer electronics have resulted in a great variety of programming, recording, and viewing options for users who view media content such as television programs. In implementing such enhanced programming, the set-top box (STB) has become an important computing device for accessing media content services and the media content within those services. In addition to supporting traditional analog broadcast video functionality, STBs may also support an increasing number of two-way digital services such as video-on-demand and personal video recording.

An STB is typically connected to a cable or satellite, or generally, a subscriber television system, and includes hardware and software necessary to provide the functionality of the subscriber television system at the user's site. The STB typically includes a processor, communication components, and memory and is connected to a television or other display device, such as a personal computer. While many STBs are stand-alone devices that are externally connected to a television, an STB and/or its functionality may be integrated into a television or personal computer or even an audio device such as a programmable radio, as will be appreciated by those of ordinary skill in the art.

STBs are typically capable of providing users with a very large number and variety of media content choices. As the number of available media content choices increases, viewing conflicts arise whereby the user must choose between watching two or more media content instances (e.g. discrete, individual instances of media content such as, for a non-limiting example, a particular television show or "program"), all of which the user may like to view. Further, because of the large number of viewing choices, the user may miss viewing opportunities. Buffering of media content instances in memory or other storage device (e.g. hard disk drive) coupled to the STB has provided some relief from the conflict in viewing choices while providing personal video recording functionality. However, current buffering mechanisms for personal video recording are confusing to the user.

As mentioned, an STB may include a personal video recording (PVR) application that provides for media content recording functionality by enabling the temporary writing to, and if requested, more permanent recording to a storage device. A PVR application is also known as a Digital Video Recording (DVR) application. The PVR application may be integrated into the STB or it may be a stand-alone unit known as a personal video recorder. A typical PVR application allows the user to view the media content in trick play modes. Trick play modes allow the user to watch media content in a non-linear fashion by recording the media content in a temporary memory buffer, often called a live cache buffer, and then replaying the recorded media content in a manner other than a normal, sequential replay. Trick play modes include, but are not limited to, slow motion, fast motion, reverse play, fast forward play, instant replay, jumping, pausing of live broadcast, and scanning.

In a typical PVR application, a progress bar is a graphical tool that is used to illustrate how much media content has been recorded during a particular time window. The length of the progress bar may correspond to the amount of media content that has been recorded in a live cache buffer or in a permanent buffer. However, a number of difficulties arise in operating a STB having a PVR application. For example, it is often difficult for a user to select and view multiple media content instances in a single viewing session.

SUMMARY

In one of many possible embodiments, the present invention provides a method and system for displaying multiple media content instances during a single viewing session. The method includes displaying a recorded program list graphical user interface (GUI) listing a number of recorded media content instances, selecting one of the recorded media content instances to be displayed on a display device, and displaying the selected media content instance and one or more additional recorded media content instances during the single viewing session.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

A method and system for displaying multiple media content instances during a single viewing session are described herein. A recorded program list graphical user interface (GUI) listing a number of recorded media content instances is first displayed. The user may select one of the recorded media content instances to be displayed on a display device. A second GUI may be displayed which is configured to allow the user to display the selected media content instance and one or more additional recorded media content instances during the single viewing session. The one or more additional recorded media content instances may be episodes related to the selected media content instance.

In the following description, for purposes of explanation, numerous specific details are set forth in order to provide a thorough understanding of the present system and method. It will be apparent, however, to one skilled in the art that the present system and method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
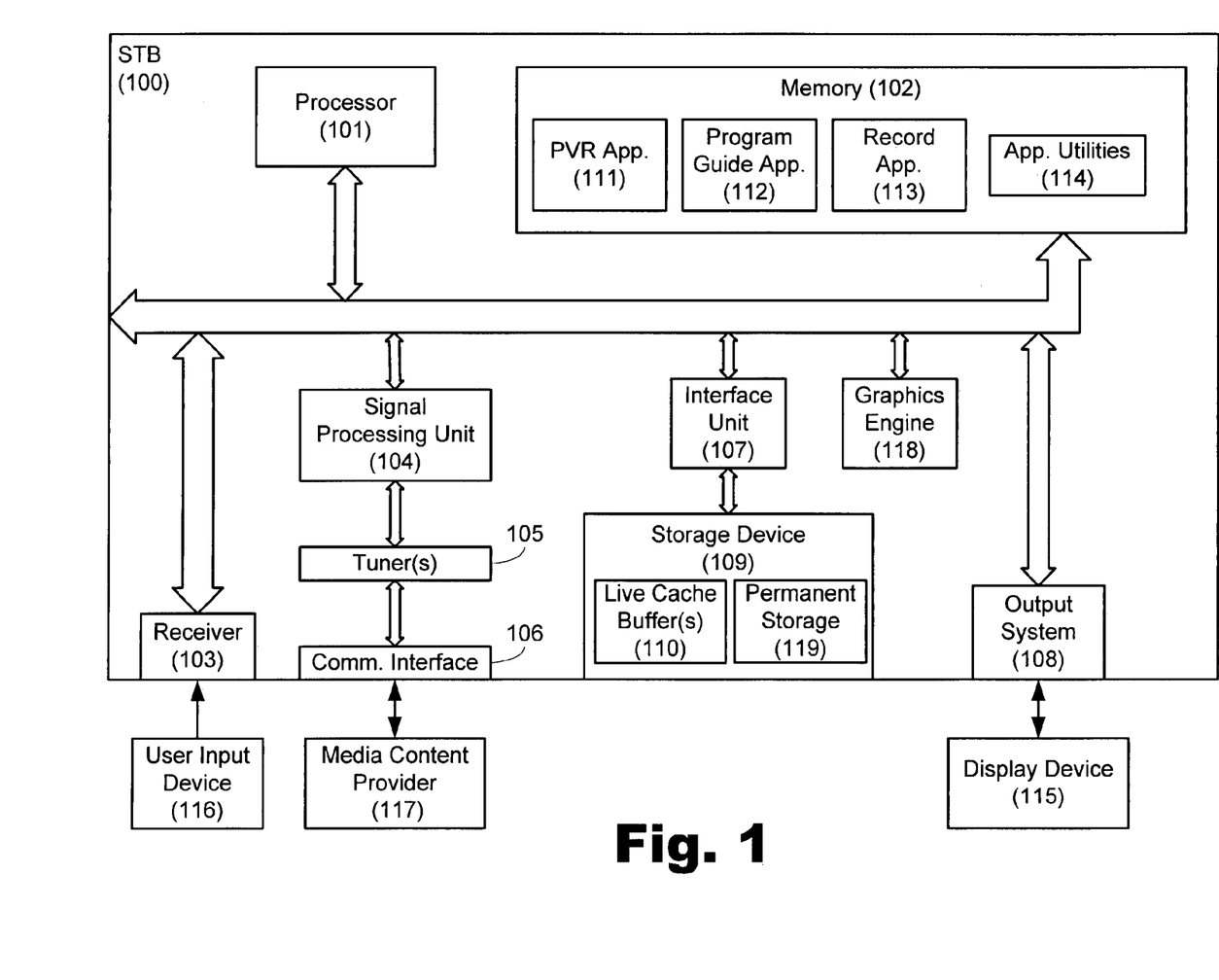
FIG. 1 is a block diagram of an exemplary set-top box (STB) according to one exemplary embodiment of the present invention.

FIG. 1 is a block diagram of an exemplary set-top box (STB) (100) according to an exemplary embodiment of the present invention. An STB (100) may also be referred to as a home communication terminal (HCT) or as a digital home communication terminal (DHCT). As used herein and in the appended claims, unless otherwise specifically denoted, the term "set-top box" will be used to refer expansively to all possible receivers that receive and decode digital and/or analog media content. It will be understood that the STB (100) shown in FIG. 1 is merely illustrative and should not be construed as implying any limitations upon the scope of the preferred embodiments of the invention.

As shown in FIG. 1, the STB (100) may include a communication interface (106) configured to receive media content from a media content provider (117). The media content provider (117) may provide various types of media content via a satellite or cable system (not shown). The media content may include, but is not limited to, television programs, pay-per-view services, video-on-demand programming, Internet services, and audio programming.

The STB (100) may also include a tuner system (105) configured to tune into a particular television channel or frequency to display media content and for sending and receiving various types of data or media content to and from the media content provider (117). According to an exemplary embodiment of the present invention, the tuner system (105) may include multiple tuners such that multiple channels of media content may be processed and/or shown on a display device (115). For example, the tuner system (105) may include a first tuner configured to receive an analog video signal corresponding to a first media content instance and a second tuner configured to simultaneously receive a digital compressed stream corresponding to a second media content instance. The tuner system (105) may have any number of tuners configured to receive any kind of media content according to one embodiment of the present invention.

The STB (100) may also include one or more processors, such as processor (101) configured to control operations of the STB (100), and an output system (108) configured to drive the display device (115). The display device (115) may be a television, computer monitor, or any other device configured to display or play the media content. The STB (100) may also include a signal processing unit (104) configured to process the media content. The signal processing unit (104) may include a demodulating and parsing system (not shown) for demodulating and parsing the media content. In one embodiment, the STB (100) may include multiple signal processing units (104) each corresponding to one of the tuners in the tuner system (105). The STB (100) may also include one or more compression and/or multiplexing units (not shown) for multiplexing various media content streams into a transport stream or the like.

One or more programmed applications (111-113) may be executed by a user of the STB (100) by utilizing the computing resources in the STB (100). The applications, or application clients, may be resident in memory (102). The memory (102) may be FLASH memory, DRAM memory, or a combination of FLASH and DRAM memory, for example. Applications (111-113) stored in memory (102) may be executed by the processor (101). Data generated by an application may be stored in the memory (102) or in a storage device (109) during the course of application execution. The memory (102) may also include application utilities (114) useful to the applications. The utilities (114) may include a timer manager, a configuration manager, a database manager, and other utilities depending on the particular applications included in the STB (100).

One of the applications may be a program guide application (112) configured to generate a program guide that is displayed on the display device (115). An exemplary program guide is a graphical user interface (GUI) that performs various functions including allowing a user to select and view program information associated with various media content. Another one of the applications may be a record application (113). The record application (113) may be configured to permanently and/or temporarily record media content in one or more buffers or storage units.

The STB (100) may also include a personal video recording (PVR) application (111). According to an exemplary embodiment, the PVR application (111) may be integrated into the STB (100), as shown in FIG. 1, or it may be a stand-alone unit. A stand-alone PVR may be coupled to an STB (100) or it may be used in place of an STB (100). As used herein and in the appended claims, the term "PVR application" will be used to refer to any application or device configured to record media content and/or allow the viewing of media content in trick play mode. Trick play modes include, but are not limited to, slow motion, fast motion, reverse play, fast forward play, instant replay, jumping, pausing of live broadcast, and scanning. In the examples contained herein, it will be assumed that the PVR application (111) is integrated into the STB (100) for illustrative purposes only. In one embodiment, the program guide application (112) and/or the record application (113) may be integrated into the PVR application (111).

The PVR application (111) provides for media content recording functionality by enabling the temporary writing to, and if requested, more permanent recording to a storage device (109). The storage device (109) may be a hard drive, optical disc, or other non-volatile storage unit. The storage device (109) of FIG. 1 is shown to be a part of the STB (100) for illustrative purposes only. It will be understood that the storage device (109) may be an external storage device.

The STB (100) may also include a graphics engine (118) configured to generate graphics to be displayed on the display device (115). The graphics may include a program guide, a progress bar, and other graphics.

In one exemplary embodiment, media content received at the tuner (105) is temporarily buffered, or stored, in a live cache buffer (110). If there are multiple tuners (105), there may be a live cache buffer (110) corresponding to each of the tuners (105). As shown in FIG. 1, the live cache buffer (110)

may be a part of the storage device (109) (e.g. a reserved portion of a hard dive). In an alternative embodiment (not shown), the live cache buffer (110) may reside in memory (102) or in a storage device external to the STB (100). Media content received into the live cache buffer (110) has a temporary recording designation. In other words, the media content stored in the live cache buffer (110) will either be deleted or retained through election by the user as a permanent recording. A permanent recording will be understood to mean media content that is stored for an extended period of time as decided by the user. Permanent recordings may be stored in a permanent storage unit (119), for example. The permanent storage unit (119) may be a part of the storage device (109) or it may be a stand-alone unit. For example, the permanent storage unit (119) may be a hard drive, an optical disc, a network drive, a buffer in memory, or any other type of permanent storage device that is a part of the storage unit (109) or that is a stand-alone unit.

Figure 2:
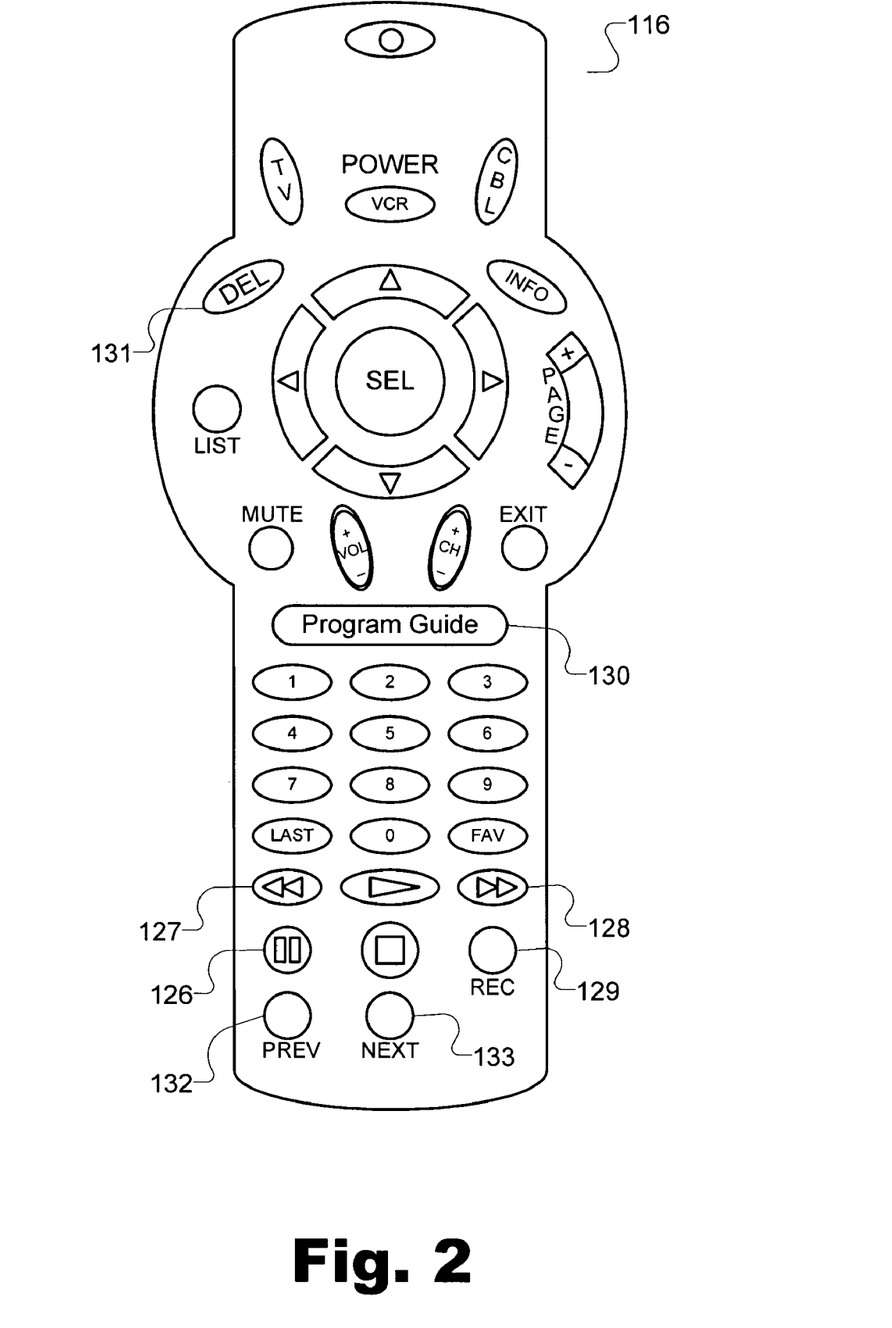
FIG. 2 illustrates an exemplary user input device according to one exemplary embodiment of the present invention.

An exemplary user input device (116) is shown in FIG. 2. The input device (116) may be a remote control, as shown in FIG. 2, or any other type of user input device such as a group of buttons (not shown) affixed to the STB (100), a touch screen input device (not shown) displayed on the display device (115), a keyboard device, or a voice activated device. The input device (116) may be configured to allow a user to control viewing options and trick play modes of the media content. For example, rewind (127) and fast-forward buttons (128) enable a user to access different frames within recorded media content instances in the permanent storage unit (119) or in the live cache buffer (110). A record button (129) may also be included which enables the user to designate as permanently recorded any media content instance buffered in the live cache buffer (110). A pause button (126) may enable the user to pause a media content instance, or pause during a search for a particular media content instance. A program guide button (130) may be configured to evoke the display of a program guide on the display device (115). A delete button (131) may be configured to delete a currently showing media content instance and/or multiple media content instances. Many alternative methods of providing user input may be used including a remote control device with different buttons and/or button layouts. The embodiments of the invention described herein are not limited by the type of device used to provide user input.

Figure 3:
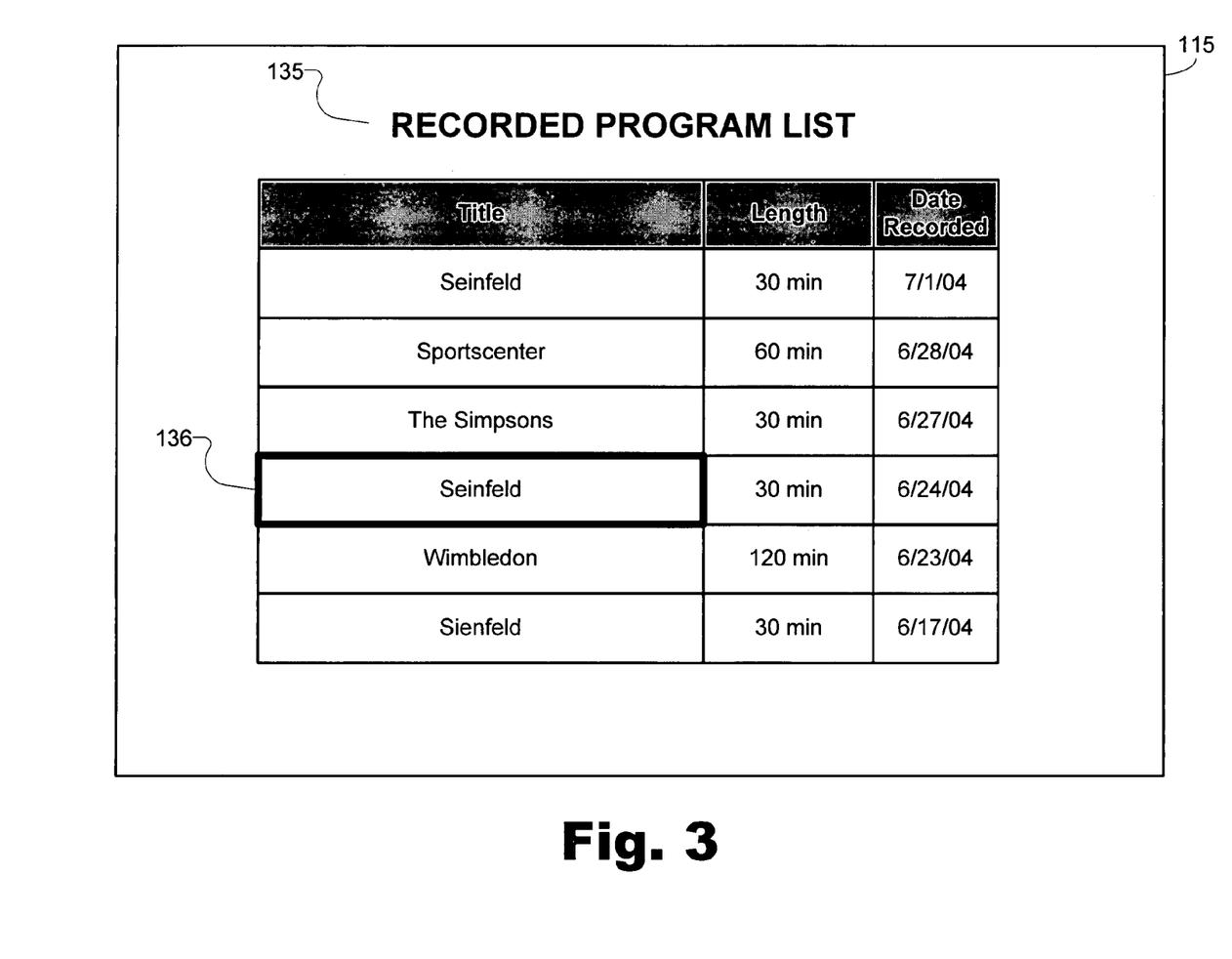
FIG. 3 illustrates an exemplary recorded program list graphical user interface (GUI) according to one exemplary embodiment of the present invention.

FIG. 3 illustrates an exemplary embodiment of the present invention wherein a recorded program list (135) may be displayed on the display device (115). The display device (115) of FIG. 3 is a television for illustrative purposes. The recorded program list (135) is a graphical user interface (GUI) that assists the user in navigating to, and between, media content instances or programs that have been permanently recorded. Any reference to recorded or stored media content instances in the following examples and in the appended claims, unless specifically denoted otherwise, refers to media content instances that are permanently stored in a permanent storage unit (119; FIG. 1).

In one embodiment, the recorded program list (135) displays a list of some or all of the media content instances that are permanently stored. For example, as shown in FIG. 3, a number of stored media content instances are listed in the recorded program list (135). The media content instances of FIG. 3 are all television programs for illustrative purposes only. The recorded program list (135) may also include other types of media content such as audio programs and Internet-related material.

As shown in FIG. 3, the recorded program list (135) may be configured to display program information corresponding to each of the recorded media content instances. As shown in FIG. 3, the program information displayed by the recorded program list (135) may include, but is not limited to, the title of the media content instances, the duration of the media content instances, and the date of recording of the media content instances. For example, the recorded program list (135) shows that an episode of Seinfeld (136) was recorded on Jun. 24, 2004 and that its duration is 30 minutes. Program information may also include, but is not limited to, genre information, ratings information, program start and stop times, program descriptions, and other pertinent program information text. According to one exemplary embodiment, the recorded program list (135) may include as much or as little program information as best serves a particular application.

The number of recorded media content instances or programs shown by the recorded program list (135) may be limited by a number of factors including the physical dimensions of the display device (115). In one embodiment (not shown), the recorded program list (135) may include scroll bars configured to allow a user to scroll through program information corresponding to various recorded media content instances that may or may not be currently displayed on the display device (135).

As shown in FIG. 3, a user often records multiple episodes of the same media content instance or program. For example, FIG. 3 shows that the multiple episodes of Seinfeld have been recorded. Although the exemplary recorded program list (135) shows that three episodes of Seinfeld have been recorded, it will be recognized that any number of episodes of the same media content instance may be recorded. A user often desires to view all of the recorded episodes of a particular media content instance during a single viewing session. Hence, according to one embodiment of the present invention and as will be explained below, the user may have the option to view a single episode or multiple episodes during a particular viewing session.

In one embodiment, as shown in FIG. 3, a user may select one of the recorded media content instances or programs for viewing. For example, the user may select the media content instance Seinfeld (136). The user may make the selection by highlighting a field in the recorded program list (135) containing the desired media content instance title or by some other known method.

Figure 4:
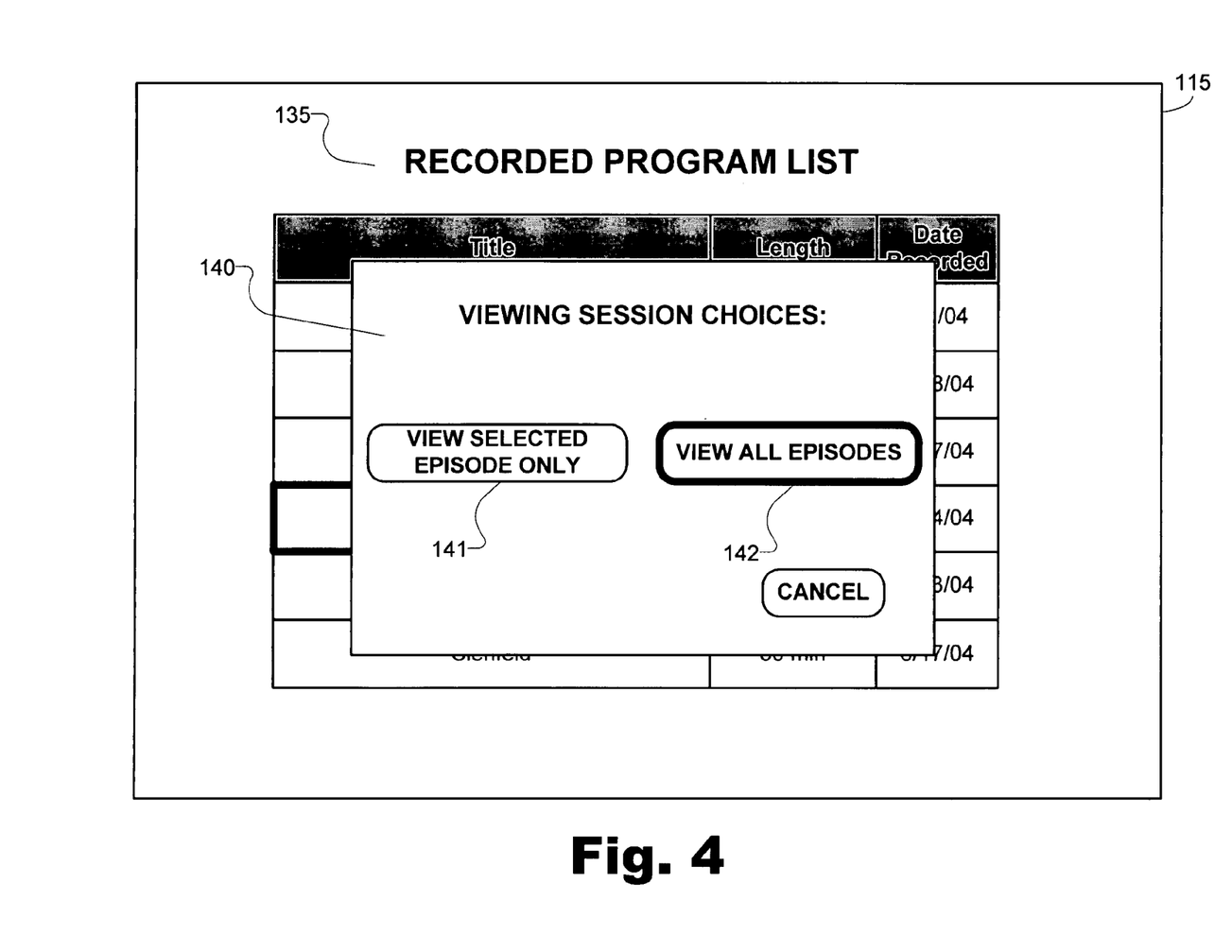
FIG. 4 illustrates a GUI configured to allow the user to select between at least two viewing choices according to one exemplary embodiment of the present invention.

After a media content instance is selected for viewing, an application within the STB (100; FIG. 1) may scan the recorded program list (135) for other recorded episodes of the selected media content instance. If no other recorded episodes exist, the selected media content instance or program is displayed on the display device (115). However, as shown in FIG. 4, if other recorded episodes of the selected media content do exist, a second GUI (140) may be displayed on the display device (115). FIG. 4 illustrates an exemplary embodiment wherein the second GUI (140) is configured to allow the user to select between at least two viewing choices. According to the embodiment, one of the viewing choices may be to view the selected episode only (141) and another one of the viewing choices may be to view all the recorded episodes (142) having the same title as the selected episode.

The second GUI (140) may be displayed in a number of different configurations according to one embodiment. For example, the GUI (140) may be entitled "Viewing Session Choices," as shown in FIG. 3, or it may have a different or no title. Furthermore, each of the viewing choices may be represented by a selectable field within the GUI (140). The second GUI (140) may be superimposed on top of the recorded program list (135), as shown in FIG. 3, or it may be occupy the entire viewing screen of the display device (115).

Figure 5:
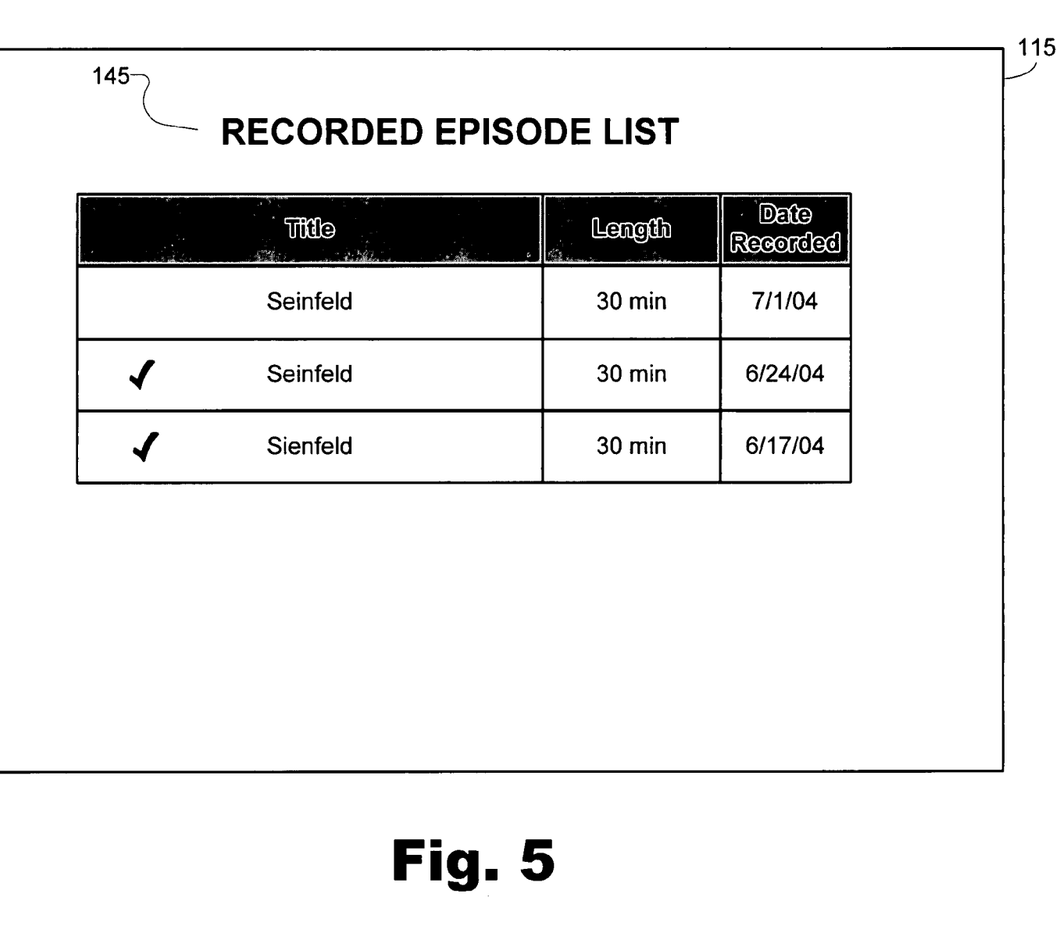
FIG. 5 illustrates a recorded episode list GUI according to one exemplary embodiment of the present invention.

As mentioned, the second GUI (140) may display a number of viewing choices. Another one of the viewing choices (not shown) may be to view a selectable number of recorded episodes (142) having the same title as the selected episode. In this case, as shown in FIG. 5, a recorded episode list GUI (145) may be displayed on the display device (115). The recorded episode list GUI (145) may be configured to list only the recorded episodes having the same title as the selected media content instance. For example, as shown in FIG. 5, the recorded episode list GUI (145) shows that three episodes of Seinfeld have been recorded. The user may then select any number of these episodes to view during a particular viewing session. For example, two episodes of Seinfeld have been selected for viewing in FIG. 5, as indicated by the check marks.

Returning to FIG. 4, if the user selects the "view selected episode only" option (141), the selected episode is displayed on the display device. However, if the "view all episodes" option (142) is selected, or if some of the recorded episodes are selected for viewing, the STB (100; FIG. 1) may be configured to display all or some of the episodes during a single viewing session. As used herein and in the appended claims, the term "viewing session" will be used to refer to a viewing time period during which some or all of a number of recorded media content instances are displayed on the display device (115). In one embodiment, the user does not have to return to the recorded program list (135; FIG. 3) during the viewing session to select an additional media content instance for viewing.

Figure 6:
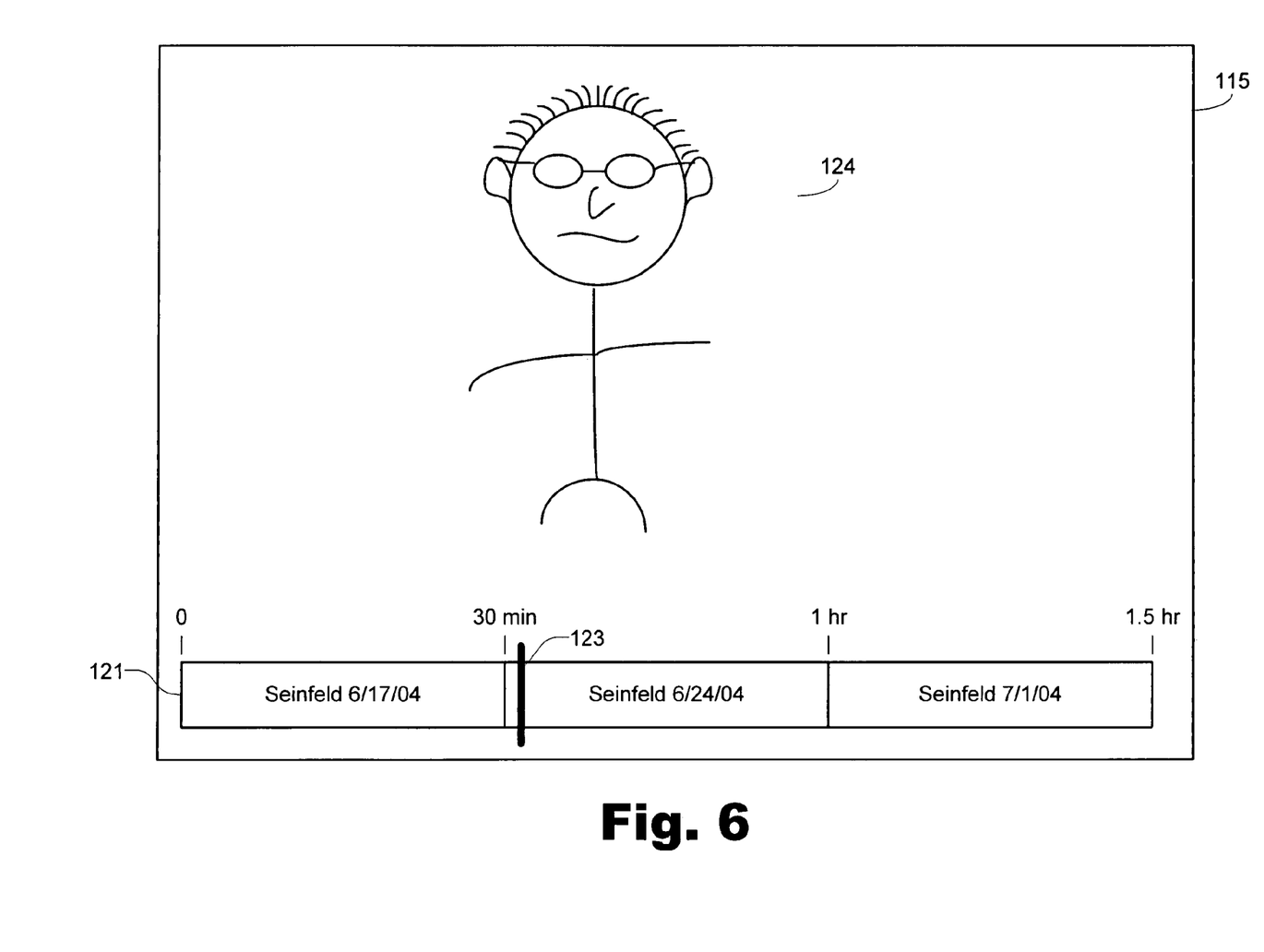
FIG. 6 shows that multiple episodes of a media content instance may be displayed in a single viewing session according to one exemplary embodiment of the present invention.

FIG. 6 illustrates an exemplary embodiment of the present invention wherein multiple episodes of a media content instance (124) may be displayed during a single viewing session. In one embodiment, the multiple episodes are displayed as a continuous stream of media content such that the episodes appear to be concatenated to the user. For example, the three episodes of Seinfeld may be displayed as a continuous stream of media content starting with the episode having the earliest recording date (Jun. 17, 2004). In one embodiment, the user does not have to return to the recorded program list (135; FIG. 3) to select a new episode for viewing after each episode is displayed.

The transition between the last frame of a particular episode and the first frame of a subsequent episode may often appear to a user to be discontinuous. For example, the end frame of the first Seinfeld episode of FIG. 6 may display credit information and the first frame of the second Seinfeld episode may display introductory material for the second Seinfeld episode. Hence, in one embodiment, the STB (100; FIG. 1) may be configured to fade out one or more frames towards the end of an episode and fade into one or more frames at the beginning of a subsequent episode. Such fading in and out of beginning and ends of episodes may be visually pleasing to a user.

In one embodiment, each episode that is displayed in the single viewing session has a corresponding media content file. The media content file comprises media content data representing the episode. In one embodiment, when a user is viewing a particular episode, the media content data from the episode's corresponding media content file is open and read by the processor (101; FIG. 1) or by some other component of the STB (100; FIG. 1). When a different episode is displayed, the previously viewed episode's corresponding media content file is closed and the new episode's corresponding media content file is opened and read by the processor (101; FIG. 1). For example, when the user views past the end of the last recorded frame of an episode, the episode's media content file is closed and the next episode's corresponding media content file is opened and read by the processor (101; FIG. 1).

As shown in FIG. 6, a progress bar (121) may also be displayed on the display device (115) according to an exemplary embodiment. The progress bar (121) is a GUI that assists the user in navigating to, and between, the episodes that are being displayed during the viewing session. In one embodiment, the progress bar (121) graphically illustrates to a user the total duration of all the episodes that are being displayed during the viewing session. The progress bar may also illustrate a number of other informational facts about the episodes as will be described below.

The progress bar (121) may graphically show the concatenated program durations of all the episodes selected by the user for viewing during the viewing session. For example, as shown in FIG. 6, the progress bar (121) shows that all three of the Seinfeld episodes have been selected for viewing during the same viewing session. In one embodiment, the progress bar (121) may be divided into a number of time segments each representing one of the episodes. Each segment may display program information related to the corresponding episode. For example, the progress bar (121) of FIG. 6 is divided into three segments each representing one of the three Seinfeld episodes. Each segment displays the title of the episode as well as the recording date. Any amount of program information may be displayed with the progress bar (121) according to an exemplary embodiment. For example, the progress bar (121) may be configured to not display any program information.

In one embodiment, the episodes are ordered sequentially in the progress bar (121) with the earliest recording date being listed first. However, the STB (100; FIG. 1) may be configured to first display the episode originally selected from the recorded program list (135; FIG. 3). For example, if the user originally selects the Seinfeld with the Jun. 24, 2004 recording date, the progress indicator (123) will be initially positioned over the segment of the progress bar (121) corresponding to the Jun. 24, 2004 recording, as shown in FIG. 6.

In one embodiment, the progress bar (121) may include a time scale to indicate the duration of the recorded media content. For example, in FIG. 6, the time scale goes from zero to 1.5 hours to indicate that there are 1.5 hours of recorded media content. The time scale and number of segments included in the time scale may vary as best serves a particular application and may be specified by the user.

The progress bar (121) may also graphically show progression through the recorded episodes as the viewer moves, or navigates, through the episodes. As shown in FIG. 6, the progress bar may include a progress indicator (123). The progress indicator (123) graphically indicates to the user the location of a frame that is currently being displayed on the display device (115). The frame may correspond to a particular location within a media content file corresponding to the current media content instance. For example, in FIG. 6, the progress indicator (123) indicates that a frame located in the beginning portion of the Seinfeld episode recorded on Jun. 24, 2004 is being displayed.

The progress indicator (123) may be a vertical line, as shown in FIG. 6. In an alternative embodiment, the progress indicator (123) may be any shape, such as a triangle, and may be located above, below, or on top of the progress bar (121). In general, the progress indicator (123) may be any graphical symbol that allows the user to quickly identify the location of a current media content instance. The terms "current media content instance," "current program," and "current episode" will be used interchangeably herein and in the appended claims, unless otherwise specifically denoted, to refer to a particular media content instance that is currently being displayed on the display device (115).

In one embodiment, the user may view the concatenated episodes in any trick play mode such as, slow motion, fast motion, reverse play or rewind, fast forward play, instant replay, jumping, pausing of live broadcast, and scanning. For example, the user may fast forward past the end of a first recorded episode and into a second recorded episode and being viewing the second recorded episode. The user may navigate the progress indicator (123) to any position within the progress bar (121) to view portions of different episodes.

Furthermore, the user may transition between episodes by pressing a "previous" button (132; FIG. 2) or a "next" button (133; FIG. 2) on a user input device (116; FIG. 2). In one embodiment, if a user is viewing a current episode and presses the "next" button (133; FIG. 2), an episode subsequent to the current episode begins to show on the display device (115).

If the current episode is the last episode in the concatenated episodes (e.g., Seinfeld Jul. 1, 2004; FIG. 6) and the user presses the "next" button (133; FIG. 2), the STB (100; FIG. 1) may be configured to continue to display the current episode. Alternatively, a GUI or pop-up message (not shown) may be displayed signaling to the user that no future episodes exist. The user may then close the pop-up message and continue viewing the current episode.

Likewise, if a user is viewing a current episode and presses the "previous" button (133; FIG. 2), an episode preceding the current episode begins to show on the display device (115). If the current episode is the first episode in the concatenated episodes (e.g., Seinfeld Jun. 17, 2004; FIG. 6) and the user presses the "previous" button (132; FIG. 2), the STB (100; FIG. 1) may be configured to continue to display the current episode. Alternatively, a GUI or pop-up message (not shown) may be displayed signaling to the user that no previous episodes exist. The user may then close the pop-up message and continue viewing the current episode.

As shown in FIG. 6, the progress bar (121) may be superimposed on top of the viewing portion of the display device (115) such that the viewer may simultaneously view the media content instance (124) and the progress bar (121). The progress bar (121) is preferably located in the bottom half of the viewing portion of the display device (115), as shown in FIG. 6, so as not to overly interfere with the current media content instance (124). However, in an alternative embodiment, the progress bar (121) may be located at any position on the viewing portion of the display device (115). Furthermore, the exact location of the progress bar (121) may be specified by the user.

Figure 7:
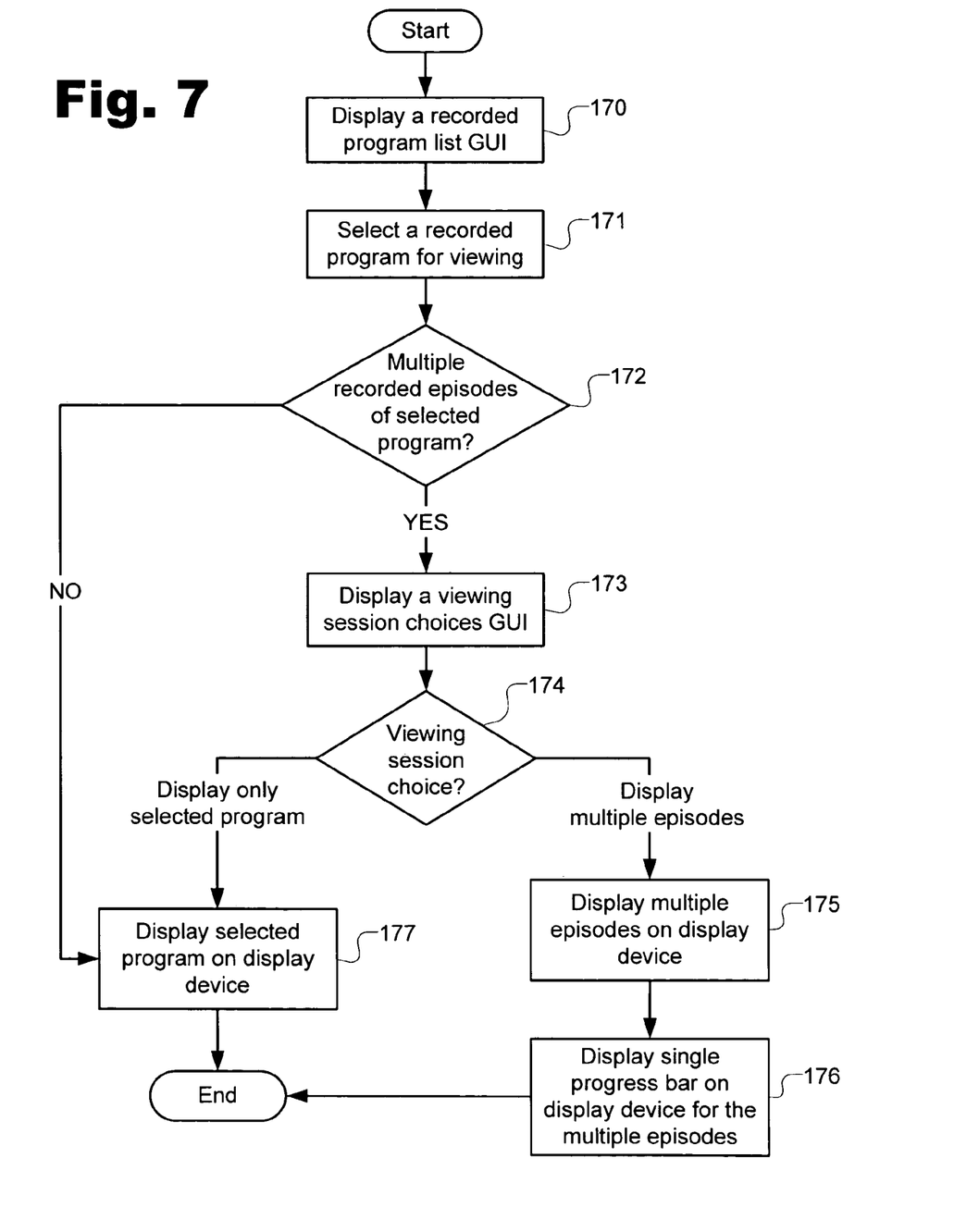
FIG. 7 is a flow chart illustrating an exemplary method of displaying one or more recorded media content instances during a single viewing session according to one exemplary embodiment of the present invention.

FIG. 7 is a flow chart illustrating an exemplary method of displaying one or more recorded media content instances during a single viewing session, according to an exemplary embodiment of the present invention. A recorded program list GUI is first displayed (step 170). A user then selects one of the recorded programs or media content instances listed in the recorded program list for viewing (step 171). The STB then determines whether there are multiple recorded episodes having the same title as the selected program (step 172). If there are not multiple recorded episodes (NO; step 172), the selected program may be displayed on the display device without further action by the STB (step 177). If there are multiple recorded episodes having the same title as the selected program (YES; step 172), a second GUI may be displayed listing a number of viewing session choices (step 173). The user may then select one of a number of viewing session options (step 174). If the user selects an option to display only the selected program, the selected program may be displayed on the display device without further action by the STB (step 177). If the user selects an option to display multiple episodes, the multiple episodes may be displayed on the display device (step 175) in a concatenated manner as described above. A single progress bar corresponding to the multiple episodes may also be displayed on the display device (step 176). The progress bar may be configured as described above.

In one embodiment, the user may delete one or more of the episodes that are being displayed at any point within the viewing session. Referring again to FIG. 6, the user may choose to delete the current episode. For example, the user may choose to delete the Seinfeld episode recorded on Jun. 24, 2004 that is currently being displayed on the display device. A number of methods may be employed to delete the episode. For example, in one embodiment, the user may select a delete button (131; FIG. 2) to delete the current episode.

Figure 8:
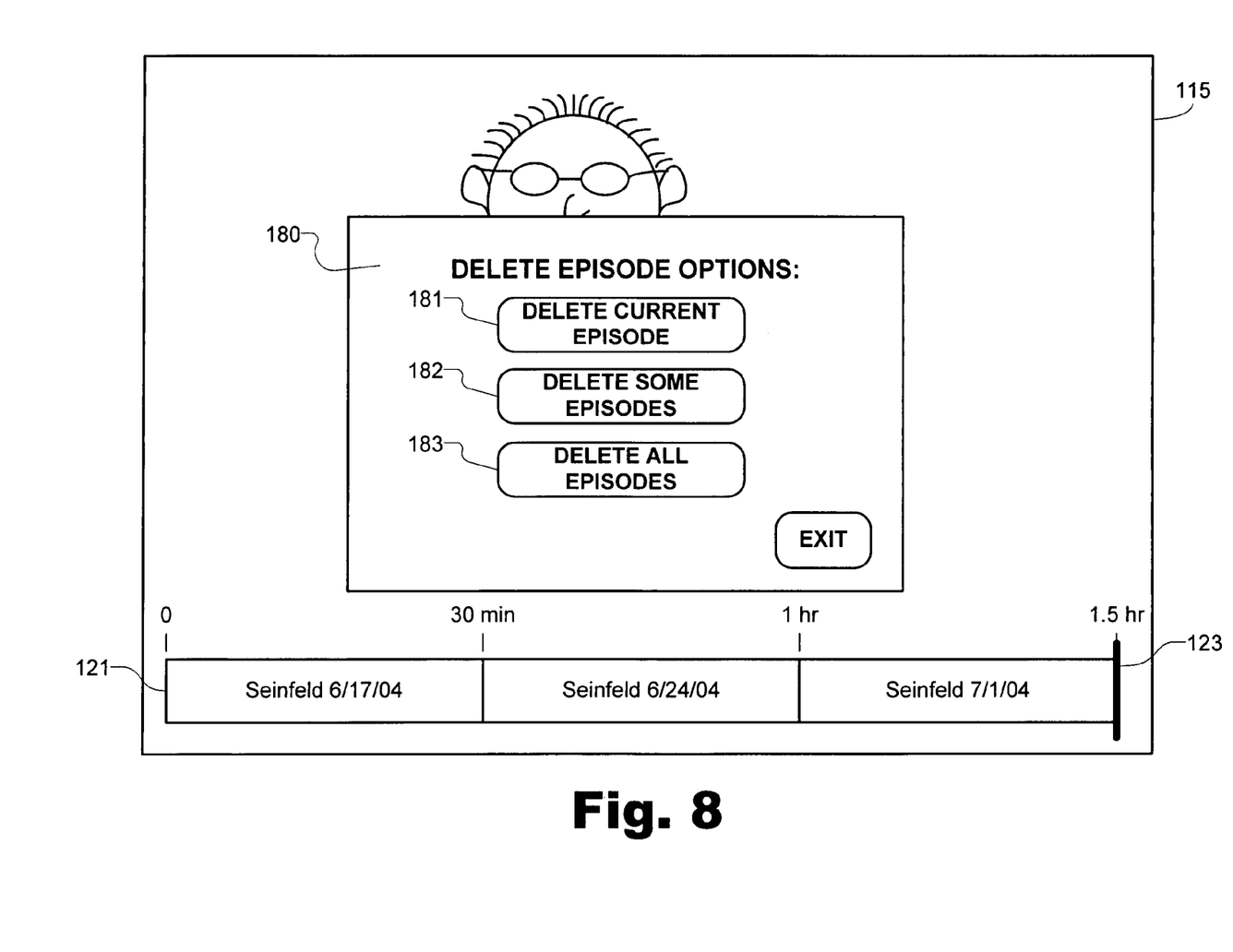
FIG. 8 illustrates an exemplary embodiment of the present invention wherein the selection of a delete button invokes the display of a GUI configured to allow a user to delete from the permanent storage device one or more of the episodes that are being displayed during a viewing session.

FIG. 8 illustrates an exemplary embodiment wherein the selection of a delete button (e.g., 131; FIG. 2) invokes the display of a GUI (180) configured to allow a user to delete from the permanent storage device (119; FIG. 1) one or more of the episodes that are being displayed during a viewing session. As shown in FIG. 8, the GUI (180) may offer a number of options to the user. For example, the user may select an option to delete an episode that currently being displayed (181) whereupon only the current episode is deleted from the permanent storage device (119). The user may also select an option to delete all the episodes that are being displayed during the viewing session (183) whereupon all of the episodes are deleted from the permanent storage device (119; FIG. 1).

Figure 9:
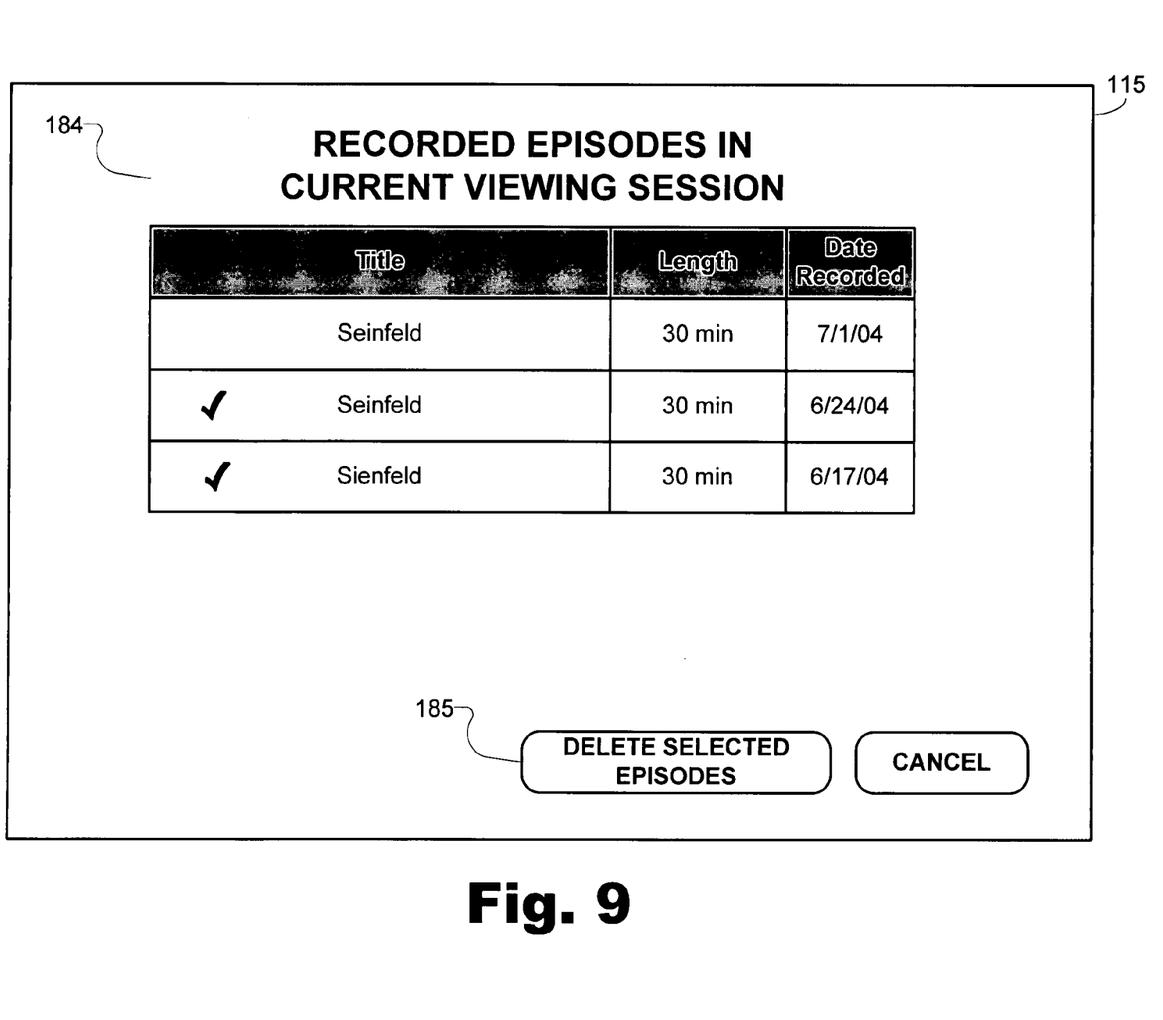
FIG. 9 illustrates a GUI configured to show a list of the recorded episodes that are being displayed during the current viewing session according to one exemplary embodiment of the present invention.

The user may alternatively select an option to delete some of the episodes that are being displayed during the viewing session (182). In this case, as shown in FIG. 9, another GUI (184) is displayed which allows the user to delete only selected episodes. As shown in FIG. 9, the GUI (184) may show a list of the recorded episodes that are being displayed during the current viewing session. The user may then select which episodes are to be deleted and then select a delete selected episodes option (185) whereupon the selected episodes are deleted from the permanent storage device (119). For example, the second and third episodes of Seinfeld listed in the GUI (184) have been selected to be permanently deleted.

Returning to FIG. 8, the GUI (180) giving the option to delete one or more episodes may be automatically invoked after the final frame of the final episode in the viewing session is displayed. For example, as shown in FIG. 8, the progress indicator (123) shows that the viewing session has ended. The GUI (180) may be automatically invoked giving the user the option to delete one or more of the episodes. The GUI (180) may include additional or different options according to an exemplary embodiment. For example, the GUI (180) may include one or more options (not shown) allowing the user to begin viewing the episodes from the beginning of the first episode or to return to the recorded program list (135; FIG. 3).

Returning to FIG. 2, the "previous" and "next" buttons (132, 133) may be configured to perform a variety of different functions. The "previous" and "next" buttons (132, 133) are labeled as such for illustrative purposes only. It will be understood that the buttons may be labeled in any manner such that the user may recognize that the buttons may be used to transition between programs and/or episodes.

Figure 10:
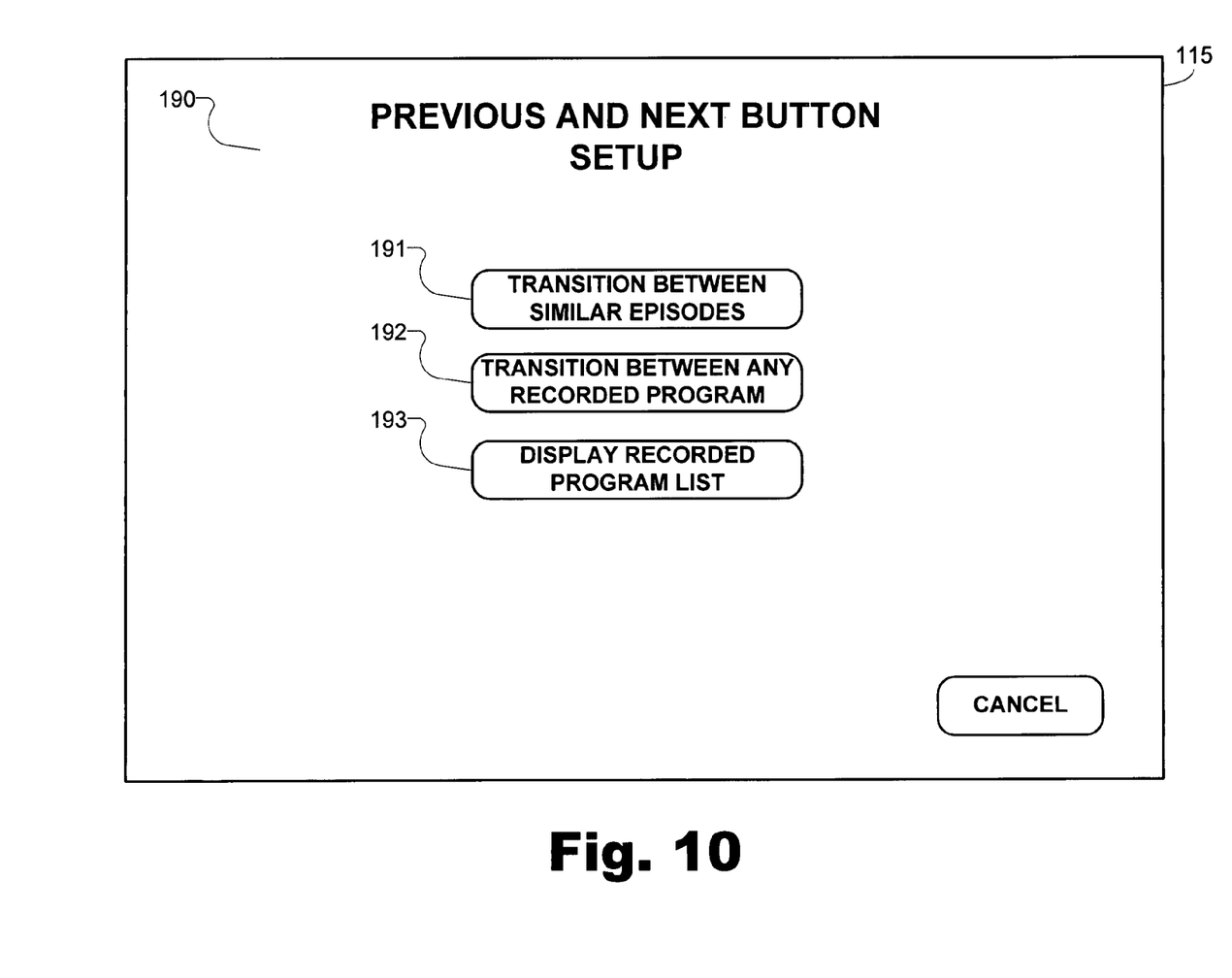
FIG. 10 illustrates a GUI configured to allow the user to set up the functionality of the "previous" and "next" buttons according to one exemplary embodiment of the present invention.

In one embodiment, as shown in FIG. 10, a GUI (190) displayed on the display device (115) may be configured to allow the user to set up the functionality of the "previous" and "next" buttons (132, 133). For example, as shown in FIG. 10, the buttons (132, 133) may be configured to transition between similar episodes only (191). Alternatively, the buttons (132, 133) may be configured to transition between any recorded program (192). In yet another embodiment, the buttons (132, 133) may be configured to invoke the display of the recorded program list (193) so that the user may select a different program to view as the previous or next program.

Figure 11:
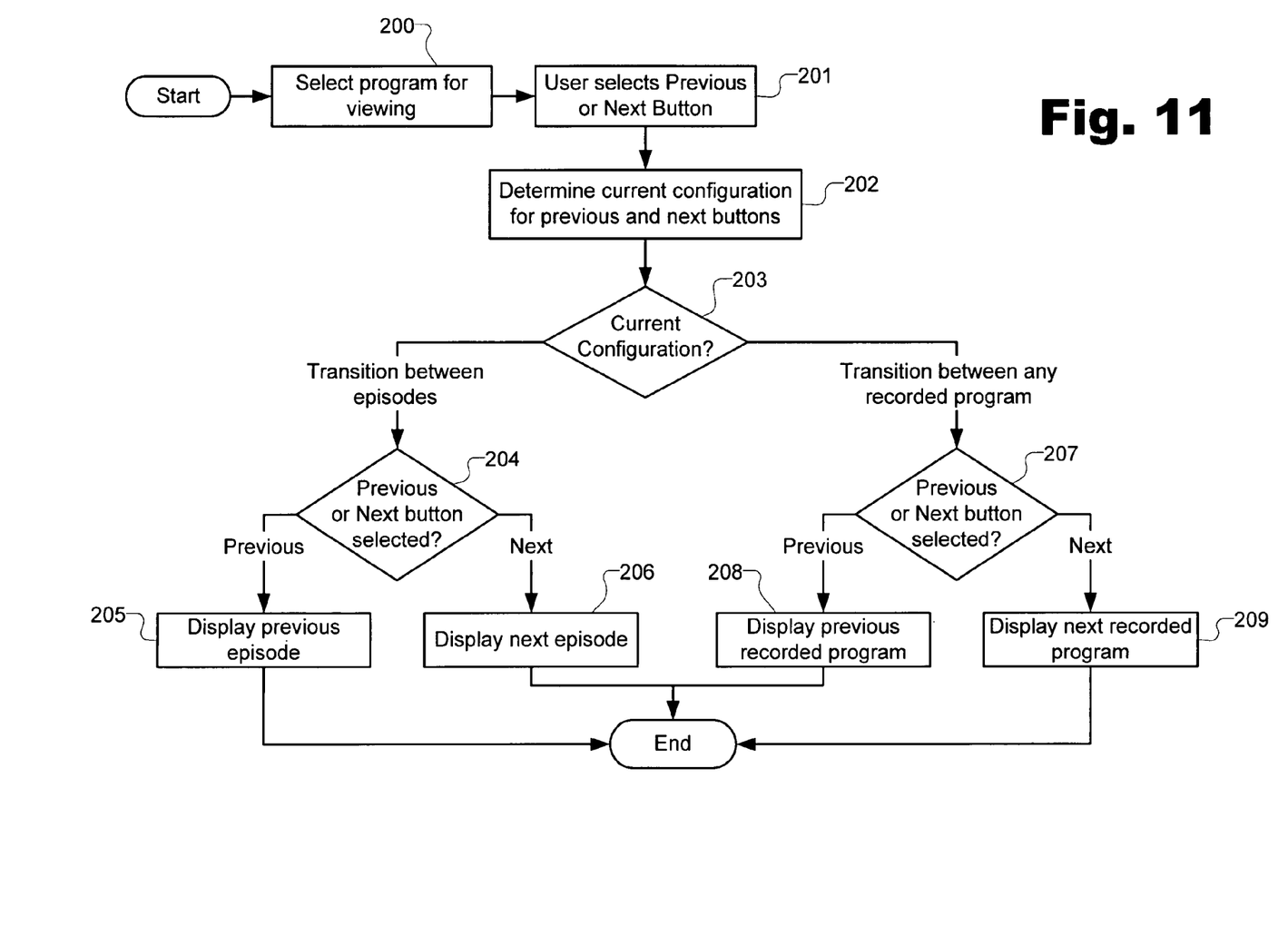
FIG. 11 is a flow chart illustrating an exemplary method of using the "previous" and "next" buttons to navigate through different programs and/or episodes according to one exemplary embodiment of the present invention.

Once the "previous" and "next" buttons (132, 133) have been configured and the user has selected a program for viewing from the recorded program list (135; FIG. 3), the user may press the "previous" and "next" buttons (132, 133) to navigate through different programs and/or episodes. FIG. 11 is a flow chart illustrating an exemplary method of using the "previous" and "next" buttons to navigate through different programs and/or episodes. As shown in FIG. 11, a program is first selected from the recorded program list for viewing (step 200). Once the program is selected and is showing on the display device, the user may select the "previous" or "next" button (step 201). The current configuration for the "previous" and "next" buttons is then determined (step 202).

If the current configuration is set to transition between episodes ("Transition between episodes"; step 203) and the "previous" button is selected ("Previous"; step 204), the previous episode may be displayed on the display device (step 205). In one embodiment, the STB (100; FIG. 1) may search the recorded program list (135) in the reverse direction in relation to the current program according to recording date for a recorded episode having the same title as the current program. If a previously recorded episode exists, the playback position of the current program may be saved for future use and the previously recorded episode may be displayed (step 205). If no previous episode exists, the STB (100; FIG. 1) may elect to not change the current episode and continue to display the current program. Alternatively, a GUI or pop-up message (not shown) may be displayed signaling to the user that no previously recorded episode exists. The user may then close the pop-up message and continue viewing the current program.

Likewise, if the current configuration is set to transition between episodes ("Transition between episodes"; step 203) and the "next" button is selected ("Next"; step 204), the next episode may be displayed on the display device (step 205). In one embodiment, the STB (100; FIG. 1) may search the recorded program list (135) in the forward direction in relation to the current program according to recording date for a recorded episode having the same title as the current program. If a next recorded episode exists, the playback position of the current program may be saved for future use and the next recorded episode may be displayed (step 206). If no next recorded episode exists, the STB (100; FIG. 1) may elect to not change the current episode and continue to display the current program. Alternatively, a GUI or pop-up message (not shown) may be displayed signaling to the user that no next recorded episode exists. The user may then close the pop-up message and continue viewing the current program.

However, if the current configuration is set to transition between any recorded program ("Transition between any recorded program"; step 203) and the "previous" button is selected ("Previous"; step 207), a previously recorded program may be displayed on the display device (step 208). In one embodiment, the STB (100; FIG. 1) may search the recorded program list (135) in the reverse direction in relation to the current program according to recording date for a previously recorded program. If a previously recorded program exists, the playback position of the current program may be saved for future use and the previously recorded program may be displayed (step 208). If no previously recorded program exists, the STB (100; FIG. 1) may elect to not change the current program and continue to display the current program. Alternatively, a GUI or pop-up message (not shown) may be displayed signaling to the user that no previously recorded program exists. The user may then close the pop-up message and continue viewing the current program.

Likewise, if the current configuration is set to transition between any recorded program ("Transition between any recorded program"; step 203) and the "next" button is selected ("Next"; step 207), the next recorded program in the recorded program list (135) may be displayed on the display device (step 209). In one embodiment, the STB (100; FIG. 1) may search the recorded program list (135) in the forward direction in relation to the current program according to recording date for a next recorded program. If a next recorded program exists, the playback position of the current program may be saved for future use and the next recorded program may be displayed (step 209). If no next program exists, the STB (100; FIG. 1) may elect to not change the current program and continue to display the current program. Alternatively, a GUI or pop-up message (not shown) may be displayed signaling to the user that no next recorded program exists. The user may then close the pop-up message and continue viewing the current program.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A method of displaying multiple recorded media content instances during a single viewing session, said method comprising:
   displaying a recorded program list graphical user interface (GUI), said recorded program list GUI listing a number of recorded media content instances;
   selecting one of said recorded media content instances to be displayed on a display device;
   displaying said selected media content instance and one or more additional recorded media content instances during said single viewing session for concatenated playback; and
   displaying a progress bar during said playback, said progress bar graphically representing a consecutive playback schedule of said selected media content instance and said one or more additional recorded media content instances within a single timeframe, said progress bar comprising a progress indicator configured to graphically represent a current position within said playback schedule.

2. The method of claim 1, further comprising displaying a GUI configured to allow a user to select between displaying only said selected media content instance and displaying said selected media content instance and said one or more additional media content instances.

3. The method of claim 1, in which said progress bar is configured to graphically represent the duration of said selected media content instance within said playback schedule and said one or more additional media content instances.

4. The method of claim 3, wherein displaying said progress bar further comprises displaying a time scale corresponding to said duration of said selected media content instance and said one or more additional media content instances.

5. The method of claim 3, further comprising displaying program information corresponding to said selected media content instance and said one or more additional media content instances.

6. The method of claim 5, wherein said program information comprises a title and recording date for each of said selected media content instance and said one or additional media content instances.

7. The method of claim 5, further comprising displaying said program information such that said program information is superimposed on top of said progress bar.

8. The method of claim 1, wherein said progress indicator is configured to be positioned at any location within said progress bar.

9. The method of claim 1, further comprising deleting any of said selected media content instance and said one or more additional media content instances.

10. The method of claim 9, wherein said step of deleting any of said selected media content instance and said one or more additional media content instances comprises displaying a deletion GUI configured to allow a user to delete said one or more of said selected media content instance and said one or more additional media content instances.

11. The method of claim 10, wherein said deletion GUI is automatically displayed after a last frame of said selected media content instance and said one or more additional media content instances is displayed on said display device.

12. The method of claim 1, wherein said additional recorded media content instances comprise recorded episodes related to said selected media content instance.

13. The method of claim 12, further comprising displaying a GUI listing all of said recorded episodes, said GUI configured to allow a user to specify which of said recorded episodes is to be displayed during said single viewing session.

14. The method of claim 1, wherein said step of displaying said selected media content instance and one or more additional media content instances further comprises displaying said selected media content instance and said one or more additional media content instances in a sequential order based on a date of recording corresponding to each of said selected media content instance and said one or more additional media content instances.

15. The method of claim 1, wherein said step of displaying said selected media content instance and said one or more additional media content instances further comprises fading between each of said selected media content instance and said one or more additional media content instances.

16. The method of claim 1, wherein said step of displaying said selected media content instance and said one or more additional media content instances further comprises displaying said selected media content instance and said one or more additional media content instances in a trick play mode.

17. The method of claim 1, further comprising transitioning from a display of a first media content instance to a display of a second media content instance in response to a transition command from a user input device, wherein said first and second media content instances are included in said selected media content instance and said one or more additional media content instances.

18. The method of claim 17, wherein said second media content instance is a recorded episode related to said first media content instance.

19. A system for displaying multiple media content instances during a single viewing session, said system comprising:
  a storage device for storing a number of recorded media content instances;
  a graphics engine configured to render graphics that are displayed on a display device; and
  a processor configured to cause said graphics engine to display a recorded program list graphical user interface (GUI), said recorded program list GUI configured to allow a user to select one of said recorded media content instances to be displayed on said display device;
  said processor being further configured to determine whether one or more additional media content instances from a same programming series as said selected media content instance have been recorded and to allow a user to select one or more of said additional recorded media content instances to be displayed on said display device;
  said processor being further configured to cause said graphics engine to display said selected media content instance and said one or more additional recorded media content instances from a same programming series on said display device during said single viewing session with concatenated playback; and
  said processor being further configured to cause said graphics engine to display a progress bar on said display device during said playback that graphically represents a consecutive playback schedule of said selected media content instance and said one or more additional media constant instances within a single timeframe, said progress bar comprising a progress indicator configured to graphically represent a current position within said playback schedule.

20. The system of claim 19, wherein said processor is further configured to cause said graphics engine to display a GUI configured to allow a user to select between displaying only said selected media content instance and displaying said selected media content instance and said one or more additional media content instances.

21. The system of claim 19, wherein said progress bar is configured to graphically represent the duration of said selected media content instance and said one or more additional media content instances.

22. The system of claim 21, wherein said progress bar comprises a time scale corresponding to said duration of said selected media content instance and said one or more additional media content instances.

23. The system of claim 21, wherein said processor is further configured to cause said graphics engine to display program information corresponding to said selected media content instance and said one or more additional media content instances.

24. The system of claim 23, wherein said program information comprises a title and recording date for each of said selected media content instance and said one or additional media content instances.

25. The system of claim 19, wherein said program information is superimposed on top of said progress bar.

26. The system of claim 19, wherein said progress indicator is configured to be positioned at any location within said progress bar.

27. The system of claim 19, wherein one or more of said selected media content instance and said one or more additional media content instances is deleted.

28. The system of claim 27, wherein said processor is configured to cause said graphics engine to display a GUI configured to allow a user to delete said one or more of said selected media content instance and said one or more additional media content instances.

29. The system of claim 28, wherein said deletion GUI is automatically displayed after a last frame of said selected media content instance and said one or more additional media content instances is displayed on said display device.

30. The system of claim 19, wherein said additional recorded media content instances are episodes in said programming series and are identified by series title.

31. The system of claim 30, wherein said processor is further configured to cause said graphics engine to display a deletion GUI listing all of said recorded episodes, said GUI configured to allow a user to specify which of said recorded episodes is to be displayed during said single viewing session.

32. The system of claim 19, wherein said selected media content instance and said one or more additional media content instances are displayed in a sequential order based on a date of recording corresponding to each of said selected media content instance and said one or more additional media content instances.

33. The system of claim 19, wherein said graphics engine is configured to fade between each of said selected media content instance and said one or more additional media content instances.

34. The system of claim 19, wherein said selected media content instance and said one or more additional media content instances are displayed in a trick play mode.

35. The system of claim 19, wherein a display of a first media content instance transitions to a display of a second media content instance in response to a transition command from a user input device, wherein said first and second media content instances are included in said selected media content instance and said one or more additional media content instances.

36. The system of claim 35, wherein said second media content instance is a recorded episode related to said first media content instance.

37. The system of claim 35, wherein said user input device is a remote control.

38. The system of claim 19, wherein said number of recorded media content instances comprises television programs.

39. The system of claim 19, further comprising a memory unit, said memory unit including a personal video recording (PVR) application.

40. A system for displaying multiple media content instances during a single viewing session, said system comprising:
   means for displaying a recorded program list graphical user interface (GUI), said recorded program list GUI listing a number of recorded media content instances;
   means for selecting one of said recorded media content instances to be displayed on a display device;
   means for identifying one or more additional media content instances related to said selected media content instance;
   means for displaying a related recorded program list graphical user interface (GUI), said related recorded program list GUI listing a number of said related recorded media content instances;
   means for selecting one of said related recorded media content instances to be displayed on said display device;
   means for displaying said selected media content instance and one or more said additional recorded media content instances during said single viewing session for concatenated playback; and
   means for displaying a progress bar during said playback, said progress bar graphically representing a consecutive playback schedule of said selected media content instance and said one or more additional recorded media content instances within a single timeframe, said progress bar comprising a progress indicator configured to graphically represent a current position within said playback schedule.

41. The system of claim 40, further comprising means for displaying a GUI configured to allow a user to select between displaying only said selected media content instance and displaying said selected media content instance and said one or more additional media content instances.

42. The system of claim 40, in which said progress bar graphically representing the duration of said selected media content instance and said one or more additional media content instances.

43. The system of claim 40, further comprising means for deleting any of said selected media content instance and said one or more additional media content instances.

44. The system of claim 43, wherein said means for deleting any of said selected media content instance and said one or more additional media content instances comprises means for displaying a deletion GUI configured to allow a user to delete said one or more of said selected media content instance and said one or more additional media content instances.

45. The system of claim 40, wherein said additional recorded media content instances comprise recorded episodes related to said selected media content instance with regard to the titles of said recorded episodes.

46. The system of claim 45, further comprising means for displaying a GUI listing all of said recorded episodes, said GUI configured to allow a user to specify which of said recorded episodes is to be displayed during said single viewing session.

47. The system of claim 40, wherein said means for displaying said selected media content instance and said one or more additional media content instances further comprises means for fading between each of said selected media content instance and said one or more additional media content instances.

48. The system of claim 40, wherein said means for displaying said selected media content instance and said one or more additional media content instances further comprises means for displaying said selected media content instance and said one or more additional media content instances in a trick play mode.

49. The system of claim 40, further comprising means for transitioning from a display of a first media content instance to a display of a second media content instance in response to a transition command from a user input device, wherein said first and second media content instances are included in said selected media content instance and said one or more additional media content instances.

* * * * *